US012801117B2

(12) United States Patent
Schindler et al.

(10) Patent No.: US 12,801,117 B2
(45) Date of Patent: Nov. 17, 2026

(54) METHOD FOR OPERATING AN ADDITIVE MANUFACTURING DEVICE

(71) Applicant: Schubert Additive Solutions GmbH, Crailsheim (DE)

(72) Inventors: Marcus Schindler, Schwabisch Hall (DE); Joerg Brenner, Frankenhardt (DE)

(73) Assignee: Schubert Additive Solutions, Crailsheim (DE)

( * ) Notice: Subject to any disclaimer, the term of this patent is extended or adjusted under 35 U.S.C. 154(b) by 84 days.

(21) Appl. No.: 17/788,691

(22) PCT Filed: Feb. 25, 2021

(86) PCT No.: PCT/EP2021/054745
§ 371 (c)(1),
(2) Date: Jun. 23, 2022

(87) PCT Pub. No.: WO2021/170751
PCT Pub. Date: Sep. 2, 2021

(65) Prior Publication Data

US 2023/0333536 A1 Oct. 19, 2023

(30) Foreign Application Priority Data

Feb. 26, 2020 (DE) ..................... 10 2020 105 052.6

(51) Int. Cl.
*G05B 19/4099* (2006.01)
*H04L 67/12* (2022.01)

(52) U.S. Cl.
CPC .......... *G05B 19/4099* (2013.01); *H04L 67/12* (2013.01); *G05B 2219/49023* (2013.01)

(58) Field of Classification Search
CPC ...... G05B 19/4099; G05B 2219/49023; G05B 2219/49007; G05B 2219/49008;
(Continued)

(56) References Cited

U.S. PATENT DOCUMENTS

| | | | |
|---|---|---|---|
| 10,254,754 | B2 | 4/2019 | McCann et al. |
| 10,546,105 | B1 | 1/2020 | Posillico et al. |

(Continued)

FOREIGN PATENT DOCUMENTS

| | | |
|---|---|---|
| CN | 105103486 | 11/2015 |
| CN | 105555509 | 5/2016 |

(Continued)

OTHER PUBLICATIONS

English translation of "CN-206048830-U" (Year: 2017).*
(Continued)

*Primary Examiner* — Charles R Kasenge
(74) *Attorney, Agent, or Firm* — Rimon PC

(57) ABSTRACT

Method for operating an additive manufacturing device of a manufacturing environment comprising one or more additive manufacturing devices, characterised in that data concerning the operation of the at least one additive manufacturing device are transferred from an external data storage device (6) to the at least one additive manufacturing device by means of a separate data connection.

21 Claims, 1 Drawing Sheet

(58) Field of Classification Search
CPC ..... H04L 67/12; H04L 63/0428; H04L 67/34; B22F 10/80; B29C 64/386; B33Y 50/00; Y02P 10/25
See application file for complete search history.

(56) References Cited

U.S. PATENT DOCUMENTS

| | | | | |
|---|---|---|---|---|
| 2010/0031046 | A1 | 2/2010 | Heinemann | |
| 2015/0350278 | A1* | 12/2015 | Isbjörnssund | B29C 64/386 700/98 |
| 2017/0039363 | A1 | 2/2017 | Chen et al. | |
| 2017/0190104 | A1* | 7/2017 | Bostick | B29C 64/106 |
| 2018/0104890 | A1 | 4/2018 | Pettis et al. | |
| 2018/0111319 | A1* | 4/2018 | Brezoczky | B29C 64/255 |
| 2020/0133234 | A1* | 4/2020 | Theirl | G06F 3/122 |
| 2020/0166907 | A1* | 5/2020 | Frederick | B33Y 10/00 |

FOREIGN PATENT DOCUMENTS

| | | | | | |
|---|---|---|---|---|---|
| CN | 206048830 | U | * | 3/2017 | |
| CN | 107526343 | A | * | 12/2017 | H04N 7/183 |
| CN | 108616501 | | | 10/2018 | |
| CN | 109202073 | | | 1/2019 | |
| CN | 110142971 | A | * | 8/2019 | B33Y 50/00 |
| EP | 2946524 | A2 | | 11/2015 | |
| KR | 20160069549 | A | * | 6/2016 | G06Q 30/06 |
| KR | 20160070477 | A | * | 6/2016 | B29C 64/386 |
| WO | 2015022572 | A2 | | 2/2015 | |

OTHER PUBLICATIONS

English Translation "CN-110142971-A" (Year: 2019).*
English Translation "KR-20160069549-A" (Year: 2016).*
English Translation of "CN-107526343-A" (Year: 2017).*
English Translation of "KR-20160070477-A" (Year: 2016).*

* cited by examiner

METHOD FOR OPERATING AN ADDITIVE MANUFACTURING DEVICE

CROSS REFERENCE TO RELATED APPLICATIONS

This application is the national phase entry of PCT application PCT/EP2021/054745, filed Feb. 25, 2021, entitled "Method for operating an additive manufacturing device", which claims priority to German patent application 10 2020 105 052.6, filed Feb. 26, 2020. The above-mentioned applications are incorporated by reference as if fully set forth herein.

BACKGROUND OF THE INVENTION

The invention relates to a method for operating an additive manufacturing device of a manufacturing environment comprising one or more additive manufacturing devices.

Various approaches are known from the prior art for the operation of additive manufacturing devices in a corresponding manufacturing environment comprising one or more additive manufacturing devices, said environment comprising a number of additive manufacturing devices. It is typically fundamental here that the operation of each of the additive manufacturing devices is controlled on the basis of data concerning the operation of the additive manufacturing device in question. Consequently, operation of the various additive manufacturing devices requires a data transfer of data concerning the operation of one particular additive manufacturing device to another particular additive manufacturing device.

Until now, it was usual to transfer data concerning the operation of a particular additive manufacturing device via a local network environment of the particular manufacturing environment, i.e. for example via a local company network, such as a LAN network or an Ethernet network, to the other particular additive manufacturing device. In respect of data transfer, the additive manufacturing devices are therefore typically connected to a local network environment.

The local network environment, however, is typically used not only to transfer corresponding data to particular additive manufacturing devices, but also to transfer other data, possibly not even related to the manufacturing process, between other devices implemented on hardware and software, connected to the company network, and possibly also not related to the manufacturing process, for example organisation, computing or management devices, of the manufacturing environment.

Sometimes, even all in-house company data traffic is exchanged over a corresponding local network environment, so that different users can also use the local network environment to access different devices communicating via the local network environment.

This configuration requires improvement in particular in respect of the operation of additive manufacturing devices of a corresponding manufacturing environment insofar as, for example with regard to a desired component and process quality, it is typically sought to ensure that data concerning the operation of particular additive manufacturing devices cannot be modified, stolen, etc.

SUMMARY OF THE INVENTION

The object of the invention is to describe a comparably improved method for operating an additive manufacturing device of a manufacturing environment comprising one or more additive manufacturing devices.

The object is achieved by a method for operating at least one additive manufacturing device of a manufacturing environment comprising one or more additive manufacturing devices according to claim 1. The claims dependent thereon relate to possible embodiments of the method.

A first aspect of the invention described herein relates to a method for operating at least one additive manufacturing device of a manufacturing environment comprising one or more additive manufacturing devices. The method serves in particular to control the operation of at least one additive manufacturing device of a manufacturing environment comprising one or more additive manufacturing devices.

The method is directed fundamentally to the operation or the control of the operation of any additive manufacturing devices (also referred to routinely as 3D printers). An additive manufacturing device that is operable or operated according to the method is therefore to be understood in principle to mean any device that is designed for the additive manufacture of one or more three-dimensional components, such as technical components or technical component groups. The actual additive manufacturing process specifically executable with the particular additive manufacturing device(s) operable or operated in accordance with the method is only of secondary importance, if any, for the execution of the method. Accordingly, in this context, reference is made merely by way of example to FDM devices, i.e. additive manufacturing devices which are designed to carry out fused-deposition modelling processes (FDM processes), or FFE devices, i.e. additive manufacturing devices which are designed to carry out fused-filament fabrication processes (FFF processes), as possible additive manufacturing devices operable or operated in accordance with the method.

Particular additive manufacturing devices are operated in accordance with the method on the basis of data concerning the operation of the particular additive manufacturing devices. The term "data" can also be understood to mean data records. Corresponding data or data records can be, in principle, or can comprise any data or data records that directly or indirectly control the operation of the particular additive manufacturing device(s). Corresponding data or data records can therefore be in particular system-specific parameters, i.e. in particular parameters concerning at least one configuration of the particular additive manufacturing device(s), and/or component-specific parameters, i.e. in particular parameters concerning at least one component to be produced by the particular additive manufacturing device(s), and/or process-specific parameters, i.e. in particular parameters concerning at least one process executable by the particular manufacturing device(s).

Corresponding data or data records can be or can comprise combinations of one or more system-specific parameters and/or one or more component-specific parameters and/or one or more process-specific parameters. Corresponding combinations can relate to a specific additive manufacturing process of a specific component with defined component properties, said process being executable by at least one specific additive manufacturing device.

Corresponding data or data records are provided in accordance with the method typically via an external data storage device, i.e. typically via a data storage device not forming a network part of the particular manufacturing environment, or can be retrieved from such a data storage device. A corresponding external data storage device is accordingly typically not connected to a local network environment, if provided, of the particular manufacturing environment. Consequently, there is typically no possibility to form a data connection between the external data storage device and a local network environment, if provided, of the particular manufacturing environment. A local network environment of the particular manufacturing environment can be, for example, a company network.

A corresponding external data storage device can be, for example, a network storage device, i.e. in particular an external server device, for example a cloud server device. A corresponding external data storage device can therefore be connected, for example, to the Internet.

In accordance with the method, corresponding data or data records can be provided by a provider. A provider can be, for example, the manufacturer of the particular additive manufacturing device(s) of the manufacturing environment and/or a developer of specific components to be manufactured additively in the manufacturing environment and/or a developer of specific structural data concerning specific components to be manufactured additively in the manufacturing environment. A corresponding provider can be generally a natural or legal person who, for example in order to avoid undesirable modifications of corresponding data or data records and/or theft of corresponding data or data records, is seeking to prevent corresponding data or data records from being transferred via a network connection located outside of its control, for example via a local network environment, if provided, of a particular manufacturing environment.

Subsequently, a corresponding external data storage device can lie under the control of a provider of corresponding data or data records. A provider of corresponding data or data records can therefore control the access to the data or data records stored in the particular external data storage device and/or changes to the data or data records stored in the particular external data storage device; consequently, a provider of corresponding data or data records can grant, for example, access and/or amendment authorisations to access and/or make changes to the data or data records stored in the particular external data storage device. Corresponding access or change authorisations can be subject to specific authorisation and/or limitation criteria; corresponding access or change authorisations can therefore be authorised or limited for example locally and/or temporally and/or in another way, so that only when specific authorisation and/or limitation criteria are satisfied—in this respect also payment criteria, i.e. the received payment of a specific fee for access to the data or data records stored in the external data storage device—is permission granted to access or makes changes to the data or data records stored in the particular external data storage device.

It is essential for the transfer of data or data records between a corresponding external data storage device and a particular additive manufacturing device that a separate or discrete data connection for transferring data or data records concerning the operation of the additive manufacturing device from the particular external data storage device is used for this purpose in accordance with the method. The data transfer of corresponding data or data records from the particular external data storage device to the particular additive manufacturing device(s) is therefore performed in accordance with the method via at least one separate or discrete data connection. In other words, in accordance with the method, at least one separate or discrete data connection, i.e. in particular a data connection independent of a possibly provided local network environment, is formed between the particular external data storage device and the particular additive manufacturing device(s) and is used for the transfer of data or data records from the particular external data storage device to the particular additive manufacturing device(s). The particular separate or discrete data connection (s) between the particular external data storage device and the particular additive manufacturing device(s) is or are therefore isolated or shielded from all other possibly provided data connection possibilities of the particular manufacturing environment, such as a local network environment, if provided; consequently, there is no possibility for connection between the particular separate or discrete data connection(s) and other data connections of the particular manufacturing environment, such as a local network environment, if provided. The separate or discrete data connection formed between the particular additive manufacturing device(s) and the particular external data storage device is therefore an independent data connection.

This means that the particular additive manufacturing device(s) in accordance with the method are connectable or connected to the particular external data storage device only via the particular separate or discrete data connection(s), and vice versa. The particular additive manufacturing device(s) in accordance with the method are therefore typically not connected to other possibly provided data connection possibilities of the particular manufacturing environment, such as a local network environment, if provided.

On account of the use of separate or discrete data connections between the particular additive manufacturing device(s) and the particular external data storage device, the method is therefore improved in respect of the operation of the particular additive manufacturing device(s) since, for example in respect of a desired component and process quality, it can be ensured that corresponding data or data records concerning the operation of particular additive manufacturing devices cannot be transferred via data connections via which said data or data records could possibly be modified, stolen, etc.

It is clear from the above that the manufacturing environment can have a local network environment, for example via a LAN network or an Ethernet network. In this case, corresponding data or data records, however, as indicated, are not transferred, i.e. either directly or indirectly, via the local network environment from the external data storage device to the particular additive manufacturing device(s), but instead the at least one separate or discrete data connection is used. In accordance with the method, a separate or discrete data connection is therefore used which is not connectable or connected to a corresponding local network environment. Consequently, a data connection is provided for the transfer of corresponding data or data records from an external data storage device to the particular additive manufacturing device(s) via a data connection that is separate or discrete and thus independent of the particular local network environment.

A particular separate or discrete data connection between the particular additive manufacturing device(s) and the particular external data storage device can be established in accordance with the method via at least one gateway device connected or formed between the particular additive manufacturing device(s) and the particular external data storage device. In accordance with the method, at least one gateway device connected or formed between the particular additive manufacturing device(s) and the particular external data storage device can therefore be used. A corresponding gateway device is therefore connectable or connected on the one hand to the particular external data storage device so that data or data records can be transferred from the particular external data storage device to the gateway device, and on the other hand connectable or connected to the particular additive manufacturing device(s) so that data or data records can be transferred from the gateway device to the particular additive manufacturing device(s).

Of course, in all cases, a bidirectional data transfer between the particular additive manufacturing device(s) and the particular external data storage device via a corresponding separate or discrete data connection is conceivable.

A particular gateway device can be equipped with at least one data storage device so that data or data records transferred from the external data storage device to the particular gateway device can be stored temporarily in the particular gateway device. The particular gateway device can therefore be designed with the function of a buffer, for example to take on a host and/or spool function for the additive manufacturing device(s) connected to the gateway device.

A corresponding data storage device can be or can comprise, for example, a volatile data storage device, for example a RAM data storage device, a DRAM data storage device, a SRAM data storage device, a SDRAM data storage device, a MRAM data storage device, or a non-volatile data storage device, for example a ROM data storage device, a PROM data storage device, an EPROM data storage device or an EEPROM data storage device.

A particular gateway device can also be equipped with a control device, implemented on hardware and/or software, for controlling and organising additive manufacturing processes of the additive manufacturing device(s) connected thereto. Consequently, in accordance with the method, manufacturing processes of the additive manufacturing device(s) connected to a particular gateway device can be controlled and/or organised via a correspondingly designed control device of the particular gateway device.

As mentioned, the described forming of a separate or discrete data connection between the particular additive manufacturing device(s) and the particular external data storage device can be implemented in accordance with the method via a gateway device. According to the method, a gateway device can therefore be used which is designed to form a network environment separate from the local network environment, if provided, of a manufacturing environment. In particular, a gateway device can be used which is designed to form a data connection to the particular external data storage device via the network environment separate from the local network environment.

In accordance with the method, a firewall device implemented on hardware and/or software can be used or provided. A corresponding firewall device can be connected or formed for example between the gateway device and the particular external data storage device. Due to the use or the provision of a firewall device, the security of the data connection formed between the corresponding gateway device and the particular external data storage device can be improved.

The firewall device and the gateway device can form an integrated component group implemented on hardware and/or software; consequently, a component group implemented on hardware and/or software can be used which comprises a gateway device and a firewall device.

In accordance with the method a virtual private network can also be formed or used between the particular additive manufacturing device(s) and the particular external data storage device. Due to the forming or use of a corresponding virtual private network and thus the forming of a communication network which is closed per se, the security of the data connection formed between the particular additive manufacturing device(s) and the particular external data storage device can be improved.

A corresponding virtual private network can be formed in accordance with the method in particular by a corresponding gateway device. Consequently, in accordance with the method a gateway device can be used which is designed to form a virtual private network between the at least one additive manufacturing device and the external data storage device. The security of the data connection formed between the corresponding gateway device and the particular external data storage device can be improved in this way.

In accordance with the method a wired and/or a wireless data connection can be formed between the at least one additive manufacturing device and the external data storage device. The data connection between the additive manufacturing device(s) and the particular external data storage device can therefore be a wired data connection or a wireless data connection. A wired data connection between the additive manufacturing device(s) and the external data storage device is typically established via a wired network structure; a corresponding wired network structure can be formed for example by a corresponding gateway device or can comprise such a gateway device. A wireless data connection between the additive manufacturing device(s) and the external data storage device is typically established via a wireless network structure; a corresponding wireless network structure can be formed for example by a corresponding gateway device or can comprise such a gateway device. Wireless data connections can be formed for example via a standard for mobile communication, in particular 4G or 5G, or via an Internet standard, in particular TCP/IP, or can use such a standard. Standards for mobile communication can expressly also be so-called third-generation mobile communication standards, consequently LTE standards, or extensions hereof, such as LTE-Advanced or 4G.

In accordance with the method a wired or a wireless connection can be formed between the at least one additive manufacturing device and the gateway device and a wired or wireless data connection can be formed between the gateway device and the external data storage device. Alternatively or additionally, in accordance with the method a wireless data connection can be formed between the at least one additive manufacturing device and the gateway device and/or a wireless data connection can be formed between the gateway device and the external data storage device.

In accordance with the method a corresponding gateway device, if provided, can also communicate with at least one external communication partner or can be connected to at least one external communication partner for data communication. An external communication partner can be, for example, a manufacturer of the corresponding gateway device and/or a provider of the particular external data storage device and/or a provider of the data or data records stored in the particular external data storage device. As mentioned, the latter can be, for example, the manufacturer of the particular additive manufacturing device(s) of the manufacturing environment and/or a developer of specific components to be manufactured additively in the manufacturing environment and/or a developer of specific structural data concerning components to be manufactured additively in the manufacturing environment. Consequently, a data connection to at least one external communication partner, for example for the purpose of controlling and/or monitoring the operation of at least one additive manufacturing device of the manufacturing environment, can be formed via a corresponding gateway device In accordance with the method a corresponding separate or discrete data connection can be formed or used which is encryptable or encrypted. Due to the forming or use of a corresponding encryptable or encrypted data connection, the security of the data connection formed between the particular additive manufacturing device(s) and the particular external data storage device can be improved. In particular, the security of a data connection formed between a corresponding gateway device, if provided, and the particular external data storage device can be improved by the forming or use of a corresponding encryptable or encrypted data connection.

Any encryption method can be considered in principle for the encryption.

In accordance with the method a corresponding gateway device can be used which is designed for encrypting a corresponding separate or discrete data connection. The data connection between the corresponding gateway device and the particular external data storage device can therefore be encrypted via the corresponding gateway device. The corresponding gateway device can be equipped for this purpose with an encryption device implemented on hardware and/or software.

In accordance with the method, at least one certified data record, which contains component-specific parameters and/or system-specific parameters and/or process-specific parameters certified by a provider for an additive manufacturing process of at least one specific component of defined component properties, can be provided via the particular external data storage device. A corresponding certified data record typically contains all necessary system-specific parameters and/or component-specific parameters and/or process-specific parameters which are necessary for the additive manufacture of a specific component with defined component properties. In other words, all system-specific and/or component-specific and/or process-specific information for the additive manufacture of a particular specific component with defined component properties, i.e. in particular also machine-readable control information for open-loop or closed-loop control of the operation of an additive manufacturing device used to perform an additive manufacturing process for the additive manufacture of a particular component with defined component properties are present in a corresponding certified data record.

Consequently, each component to be manufactured or produced can be provided with its own certified data record. This is therefore the case in particular since system-specific parameters and/or component-specific parameters and/or process-specific parameters are necessary to provide specific component properties, and consequently specific component properties can be correlated with specific system-specific parameters and/or component-specific parameters and/or process-specific parameters, so that only a specific combination of system-specific parameters and/or component-specific parameters and/or process-specific parameters allows reliable and reproducible additive manufacturing of a component with defined component properties. It is thus clear that the at least one certified data record typically contains a specific combination of system-specific parameters and/or component-specific parameters and/or process-specific parameters for producing a specific component with defined component properties.

A specific combination of corresponding parameters contained in the at least one certified data record relates here typically to a specific additive manufacturing process of a specific component with defined component properties executable with a specific additive manufacturing device. The at least one certified data record therefore contains typically a combination of system-specific parameters and/or component-specific parameters and/or process-specific parameters tailored to a specific additive manufacturing process executable by a specific additive manufacturing device, which combination of parameters allows reliable and reproducible additive manufacturing of a component with defined component properties. Consequently, certified data records for the manufacture of components with the same defined component properties may nevertheless differ from one another in at least one system-specific parameter and/or component-specific parameter and/or process-specific parameter, if these components are based on different additive manufacturing processes and/or the operation of different additive manufacturing devices.

A particular additive manufacturing process for manufacturing a particular component with defined component properties can be performed without user intervention, in particular fully automatically, solely on the basis of the at least one certified data record. At least one additive manufacturing process can therefore be used fully automatically, i.e. in particular without user intervention, for the additive manufacture of at least one specific component with defined component properties by means of an additive manufacturing device on the basis of the at least one certified data record.

A corresponding certified data record can also contain machine-readable control information for the, in particular fully automatic, open-loop or closed-loop control of the operation of at least one additive manufacturing device for the additive manufacture of the at least one component to be manufactured additively on the basis of the at least one certified data record. Corresponding control information can be, for example, a particular machine code (G-code) of a particular additive manufacturing device. Corresponding control information can be described directly or indirectly by corresponding system-specific parameters and/or component-specific parameters and/or process-specific parameters contained in the at least one certified data record.

A corresponding certified data record can also contain system-specific parameters and/or component-specific parameters and/or process-specific parameters certified by a provider for the preparation of an additive manufacturing process of the or at least one specific component with defined component properties. A user therefore does not himself require any knowledge of a corresponding preparatory measure, since all "knowledge" necessary for this purpose can be contained in the at least one certified data record.

The at least one measure for preparing the additive manufacturing process applied on the basis of a corresponding certified data record can comprise, for example, a measure for preparing a construction material to be used within the scope of the additive manufacturing process performed for the additive manufacture of a component with specific component properties, in particular a temperature control, drying, inerting, etc. if the construction material. The measure is typically selected in view of an additive manufacturing process that is to be applied specifically or in view of a construction material used specifically within the scope of the execution of an additive manufacturing process that is to be applied specifically. For example, powder-(bed-) based additive manufacturing processes require different preparatory measures in comparison to non-powder-(bed-) based additive manufacturing processes.

A corresponding certified data record can also contain system-specific parameters and/or component-specific parameters and/or process-specific parameters certified by a provider for the finishing of the, or at least one, additive manufacturing process. A user therefore does not himself require any knowledge of a corresponding finishing measure, since all "knowledge" necessary for this purpose can be contained in the at least one certified data record.

The at least one measure for the finishing of the additive manufacturing process can comprise a measure for finishing the component additively manufactured within the scope of the additive manufacturing process applied on the basis of the at least one certified data record, in particular. a mechanical and/or thermal post-treatment of the additively manufactured component, for example a mechanical surface processing at least in some sections to produce specific surface properties, a thermal treatment in at least some sections to produce specific structural properties, etc. The measure is typically selected in view of an additive manufacturing process that is to be applied specifically or in view of a construction material used specifically within the scope of the execution of an additive manufacturing process that is to be applied specifically. For example, components manufactured by means of powder-(bed-)based additive manufacturing processes require different finishing measures in comparison to components not manufactured by means of powder-(bed-)based additive manufacturing processes. Equally, components manufactured for example from metal may require different finishing measures in comparison to components manufactured from plastic.

It is true for all embodiments that a corresponding gateway device is formed as a network device, i.e. in particular as a router, or can form part of such a network device. In particular, routers which are designed for the forming of wireless data connections via a standard for mobile communication, in particular LTE, 4G or 5G, can be considered. Corresponding routers can be assigned information for identifying the gateway device or the router or an additive manufacturing device equipped therewith, for example via a network card, SIM card or the like. All comments made in conjunction with a gateway device apply similarly for a router; consequently, a router can comprise for example a firewall device implemented on hardware and/or software and/or a data storage device implemented on hardware and/or software.

A corresponding gateway device, i.e. in particular a corresponding router, can be arranged or formed on or in an additive manufacturing device. Consequently, a corresponding gateway device, i.e. in particular a corresponding router, can be integrated structurally into an additive manufacturing device. A corresponding structural integration can be realised for example in such a way that a receiving region or space, for example a chamber-like or -shaped receiving region or space, in which the corresponding gateway device or the router is arranged or formed, is arranged or formed on or in a housing portion of the particular additive manufacturing device, for example on or in a base plate. A corresponding receiving region or space can be closed at least in some sections, optionally fully, in order to protect the corresponding gateway device or the router against external influences. A corresponding receiving region or space can be embodied with fastening interfaces, i.e. in particular mechanical fastening interfaces, which allow a (mechanically) stable fastening of the corresponding gateway device or of the router.

A correspondingly configured additive manufacturing device, besides the particular function components for carrying out an additive manufacturing operation, which may vary depending on the specific configuration of the additive manufacturing operation or the additive manufacturing process implementable therewith, can therefore also comprise a gateway device or a router, via which a separate data connection to or with an external data storage device can be formed or established. This can be implemented in particular in an automatable or automated manner, so that the particular additive manufacturing device establishes or maintains a separate data connection to or with an external data storage device independently via the integrated gateway device. A corresponding data connection can be embodied as a VPN tunnel or in the manner thereof.

In this regard, gateway devices or routers which are designed for forming wireless data connections via a standard for mobile communication, in particular LTE, 4G or 5G, can be considered expediently. In this way, the data connection between the particular additive manufacturing device and the external data storage device can be formed or established or maintained via a separate independent data connection which is fully independent of a local network environment. This represents a significant increase in security, for example against data theft, and, because the data connection, as mentioned, can be established and maintained in an automatable or automated manner independently via the additive manufacturing device, simplifies the set-up of the additive manufacturing device because an integration thereof into an existing (local) network environment is neither necessary nor desirable.

Correspondingly configured additive manufacturing devices can therefore have just one connection for power supply; a connection for a, for example socket-like or -shaped, network cable or the like is not necessary.

A second aspect of the invention relates to a manufacturing environment comprising at least one additive manufacturing device and possibly a local network environment. The manufacturing environment is characterised by a gateway device which is designed to form a separate data connection to an external data storage device, via which connection data or data records concerning the operation of the additive manufacturing device are to be transferred from the external data storage device, i.e. in particular an external data storage device located outside a local network environment, if provided, of the manufacturing environment, to the at least one additive manufacturing device of the manufacturing environment.

The gateway device can be configured and structurally integrated into an additive manufacturing device in the manner described further above.

A third aspect of the invention relates to a communication or data transfer system comprising:

a manufacturing environment comprising at least one additive manufacturing device and possibly a local network environment, an external data storage device in which data or data records concerning the operation of the additive manufacturing device are storable or stored, a gateway device which is designed to form a data connection which is separate or discrete, in particular from the local network environment, if provided, and via which data or data records concerning the operation of the additive manufacturing device are to be transferred from the external data storage device to the at least one additive manufacturing device of the manufacturing environment.

The gateway device can be configured and integrated structurally into an additive manufacturing device in the manner described further above All aspects in conjunction with the with the method according to the first aspect of the invention apply similarly for the manufacturing environment according to the second aspect of the invention and for the communication or data transfer system according to the third aspect of the invention.

BRIEF DESCRIPTION OF THE DRAWINGS

The invention will be explained in greater detail on the basis of exemplary embodiments in the drawings, in which.

DETAILED DESCRIPTION OF THE EMBODIMENTS

Figure 1:
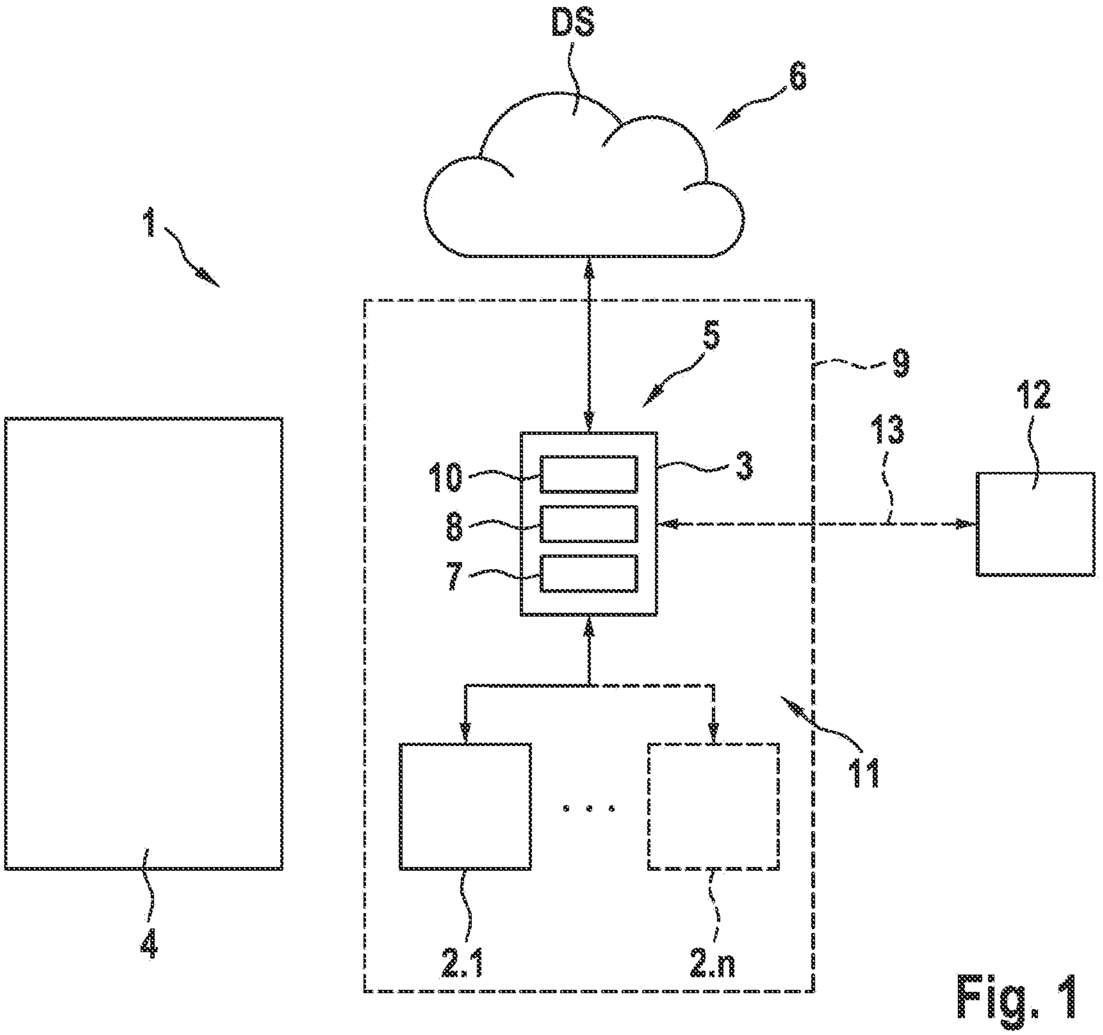
FIG. 1 shows a schematic diagram of a manufacturing environment according to an exemplary embodiment.

The manufacturing environment 1 comprises one or more additive manufacturing devices 2.1-2.*n*. The additive manufacturing devices 2.1-2.*n* can be, for example, FDM or FFF devices.

The manufacturing environment 1 additionally comprises a gateway device 3, which is designed to form a data connection 5, which in particular is separate or discrete from a local network environment 4 (optional), such as a company network, of the manufacturing environment, and via which data or data records concerning the operation of the additive manufacturing device(s) 2.1-2.*n* are to be transferred from an external data storage device 6 to the additive manufacturing device(s) 2.1-2.*n* of the manufacturing environment 1.

The exemplary configuration shown in FIG. 1 can therefore be referred to or considered equally as a communication system which is formed by or comprises the additive manufacturing device(s) 2.1-2.*n*, the gateway device 3 and the external data storage device 6.

A method for operating at least one additive manufacturing device 2.1-2.*n* of the manufacturing environment 1 can be implemented with the configuration shown in FIG. 1. The method serves in particular to control the operation of at least one additive manufacturing device 2.1-2.*n* of the manufacturing environment 1.

Particular additive manufacturing devices 2.1-2.*n* are operated in accordance with the method on the basis of data or data records DS concerning the operation of the particular additive manufacturing devices 2.1-2.*n*. Corresponding data or data records DS can be, in principle, or can comprise any data or data records that directly or indirectly control the operation of the particular additive manufacturing device(s) 2.1-2.*n*. Corresponding data or data records DS can therefore be in particular system-specific parameters, i.e. in particular parameters concerning at least one configuration of the particular additive manufacturing device(s) 2.1-2.*n*, and/or component-specific parameters, i.e. in particular parameters concerning at least one component to be produced by the particular additive manufacturing device(s) 2.1-2.*n*, and/or process-specific parameters, i.e. in particular parameters concerning at least one process executable by the particular manufacturing device(s) 2.1-2.*n*.

In accordance with the method, corresponding data or data records DS are provided by or retrieved from the external data storage device 6, which does not form a network part of the manufacturing environment 1. The external data storage device 6 is accordingly not connected to the local network environment 4 of the manufacturing environment 1. Consequently, there is no possibility to form a data connection between the external data storage device 6 and the local network environment 4 of the manufacturing environment.

The external data storage device 6 in the exemplary embodiment is a network storage device, i.e. in particular an external server device, for example a cloud server device. The external data storage device 6 can therefore be connected to the Internet.

Corresponding data or data records DS can be provided by a provider. A provider can be, for example, the manufacturer of the particular additive manufacturing device(s) 2.1-2.*n* of the manufacturing environment 1 and/or a developer of specific components to be manufactured additively in the manufacturing environment 1 and/or a developer of specific structural data concerning specific components to be manufactured additively in the manufacturing environment 1. A corresponding provider can be a natural or legal person who, for example in order to avoid undesirable modifications of corresponding data or data records DS and/or theft of corresponding data or data records DS, is seeking to prevent corresponding data or data records DS from being transferred via a network connection located outside of its control, for example via the local network environment 4 of the manufacturing environment 1.

Subsequently, the external data storage device 6 can lie under the control of a provider of corresponding data or data records DS. A provider of corresponding data or data records DS can therefore control the access to the data or data records DS stored in the external data storage device 6 and/or changes to the data or data records DS stored in the external data storage device 6; consequently, a provider of corresponding data or data records DS can grant, for example, access and/or change authorisations to access and/or make changes to the data or data records DS stored in the external data storage device 6. Corresponding access or change authorisations can be subject to specific authorisation and/or limitation criteria; corresponding access or change authorisations can therefore be authorised or limited for example locally and/or temporally and/or in another way, so that only when specific authorisation and/or limitation criteria are satisfied—in this respect also payment criteria, i.e. the received payment of a specific fee for access to the data or data records DS stored in the external data storage device—is permission granted to access or makes changes to the data or data records DS stored in the external data storage device 6.

It is essential for the transfer of data or data records DS between the external data storage device 6 and a particular additive manufacturing device 2.1-2.*n* that the separate or discrete data connection 5 is used for this purpose. The data transfer of corresponding data or data records DS from the external data storage device 6 to the particular additive manufacturing device(s) 2.1-2.*n* is therefore performed via the separate or discrete data connection 5, i.e. in particular a data connection independent of the local network environment 4, between the external data storage device 6 and the particular additive manufacturing device(s) 2.1-2.*n*, via which data or data records DS are transferred from the external data storage device 6 to the particular additive manufacturing device(s) 2.1-2.*n*. The separate or discrete data connection 5 between the external data storage device 6 and the particular additive manufacturing device(s) 2.1-2.*n* is or are therefore isolated or shielded from all other possibly provided data connection possibilities of the manufacturing environment 1, i.e. in particular from the local network environment 4; consequently, there is no possibility for connection between the particular separate or discrete data connection 5 and other data connections of the manufacturing environment 1, i.e. in particular the local network environment 4. The separate or discrete data connection 5 formed between the particular additive manufacturing device(s) 2.1-2.*n* and the external data storage device 6 is therefore an independent data connection.

This means that the particular additive manufacturing device(s) 2.1-2.*n* are connectable or connected to the external data storage device 6 only via the separate or discrete data connection 5, and vice versa. The particular additive manufacturing device(s) 2.1-2.*n* are therefore not connected to other possibly provided data connection possibilities of the manufacturing environment 1, such as the local network environment 4 in particular.

On account of the use of separate or discrete data connections between the particular additive manufacturing device(s) 2.1-2.*n* and the external data storage device 6, the method is therefore improved in respect of the operation of the particular additive manufacturing device(s) 2.1-2.*n* since, for example in respect of a desired component and process quality, it can be ensured that corresponding data or data records DS concerning the operation of particular additive manufacturing devices 2.1-2.*n* cannot be transferred via data connections via which said data or data records could possibly be modified, stolen, etc.

The separate or discrete data connection 5 between the particular additive manufacturing device(s) 2.1-2.*n* and the external data storage device 6 is established in the exemplary embodiment via the gateway device 3 connected or formed between the particular additive manufacturing device(s) 2.1-2.*n* and the external data storage device 6. In accordance with the method, the gateway device 3 connected or formed between the particular additive manufacturing device(s) 2.1-2.*n* and the external data storage device 6 is therefore used. The gateway device 3 is therefore connectable or connected on the one hand to the external data storage device 6 so that data or data records DS can be transferred from the external data storage device 6 to the gateway device 3, and on the other hand connectable or connected to the particular additive manufacturing device(s) 2.1-2.*n* so that data or data records DS can be transferred from the gateway device 3 to the particular additive manufacturing device(s) 2.1-2.*n*.

Of course, in all cases, a bidirectional data transfer between the particular additive manufacturing device(s) 2.1-2.*n* and the external data storage device 6 via the separate or discrete data connection 5 is conceivable.

The gateway device 3 can be equipped with at least one data storage device 7 so that data or data records DS transferred from the external data storage device 6 to the gateway device 3 can be stored temporarily in the gateway device 3. The gateway device 3 can therefore be designed with the function of a buffer, for example to take on a host and/or spool function for the additive manufacturing device (s) connected to the gateway device.

The gateway device 3 can also be equipped with a control device 8, implemented on hardware and/or software, for controlling and organising additive manufacturing processes of the additive manufacturing device(s) 2.1-2.*n* connected thereto. Consequently, in accordance with the method, manufacturing processes of the additive manufacturing device(s) 2.1-2.*n* connected to the gateway device can be controlled and/or organised via a correspondingly designed control device 8 of the gateway device 3.

As mentioned, the described forming of a separate or discrete data connection 5 between the particular additive manufacturing device(s) 2.1-2.*n* and the external data storage device 6 can be implemented via the gateway device 3. The used gateway device 3 can therefore be designed to form a network environment 9 separate from the local network environment 4. In particular, the gateway device 3 can be designed to form a data connection 5 to the external data storage device 9 via the network environment 9 separate from the local network environment 4.

In accordance with the method, a firewall device 10 implemented on hardware and/or software can be used. The firewall device 10 can be connected or formed for example between the gateway device 3 and the external data storage device 6. Due to the use or the provision of a firewall device 10, the security of the data connection 5 formed between the gateway device 3 and the external data storage device 6 can be improved.

In the exemplary embodiment the firewall device 10 and the gateway device 3 form, by way of example, an integrated component group implemented on hardware and/or software.

In accordance with the method a virtual private network 11 can be formed between the particular additive manufacturing device(s) 2.1-2.*n* and the external data storage device 6. Due to the forming of a corresponding virtual private network 11 and thus the forming of a communication network which is closed per se, the security of the data connection 5 formed between the particular additive manufacturing device(s) 2.1-2.*n* and the external data storage device 6 can be improved.

A corresponding virtual private network 11 can be formed by the gateway device 3.

The separate or discrete data connection 5 between the particular additive manufacturing device(s) 2.1-2.*n* and the external data storage device 6 can be formed as a wired and/or a wireless data connection. A wired data connection 5 is typically established via a wired network structure, which for example can be formed by or can comprise the gateway device 3. A wireless data connection is typically established via a wireless network structure, which can be formed by or can comprise the gateway device 3. Wireless data connections can be formed for example via a standard for mobile communication, in particular 4G or 5G, or via an Internet standard, in particular TCP/IP, or can use such a standard.

The gateway device 3 can optionally also communicate with at least one external communication partner 12 or can be connected to at least one external communication partner 12 for data communication. An external communication partner 12 can be, for example, a manufacturer of the gateway device 3 and/or a provider of the external data storage device 6 and/or a provider of the data or data records DS stored in the external data storage device 6. As mentioned, the latter can be, for example, the manufacturer of the particular additive manufacturing device(s) 2.1-2.*n* and/or a developer of specific components to be manufactured additively in the manufacturing environment 1 and/or a developer of specific structural data concerning components to be manufactured additively in the manufacturing environment 1. Consequently, a data connection 13 to at least one external communication partner 12, for example for the purpose of controlling and/or monitoring the operation of at least one additive manufacturing device 2.1-2.*n*, can be formed via the gateway device 3.

In accordance with the method a corresponding separate or discrete data connection 5 can be formed or used which is encryptable or encrypted. Due to the forming or use of a corresponding encryptable or encrypted data connection 5, the security of the data connection 5 formed between the particular additive manufacturing device(s) 2.1-2.*n* and the external data storage device 6 can be improved. In particular, the security of a data connection formed between a corresponding gateway device, if provided, and the particular external data storage device can be improved by the forming or use of a corresponding encryptable or encrypted data connection. Any encryption method can be considered in principle for the encryption.

The gateway device 3 can be designed for encrypting the separate or discrete data connection 5. The separate or discrete data connection 5 between the gateway device 3 and the external data storage device 6 can therefore be encrypted via the gateway device 3. The gateway device 3 can be equipped for this purpose with an encryption device implemented on hardware and/or software.

In accordance with the method, a certified data record, which contains component-specific parameters and/or system-specific parameters and/or process-specific parameters certified by a provider for an additive manufacturing process of at least one specific component of defined component properties, can be provided via the external data storage device 6. A corresponding certified data record typically contains all necessary system-specific parameters and/or component-specific parameters and/or process-specific parameters which are necessary for the additive manufacture of a specific component with defined component properties. In other words, all system-specific and/or component-specific and/or process-specific information for the additive manufacture of a particular specific component with defined component properties, i.e. in particular also machine-readable control information for open-loop or closed-loop control of the operation of an additive manufacturing device used to perform an additive manufacturing process for the additive manufacture of a particular component with defined component properties are present in a corresponding certified data record.

As mentioned, the local network environment 4 of the manufacturing environment 1 is optional. The comments made above therefore apply similarly for configurations of a corresponding manufacturing environment 1 without local network environment 4. In this configuration of a manufacturing environment 1 too, secure transfer of data or data records DS from an external data storage device 6 to the particular additive manufacturing devices 2.1-2.*n* is possible by the use of a separate or discrete data connection 5 between particular additive manufacturing devices 2.1-2.*n*.

Figure 2:
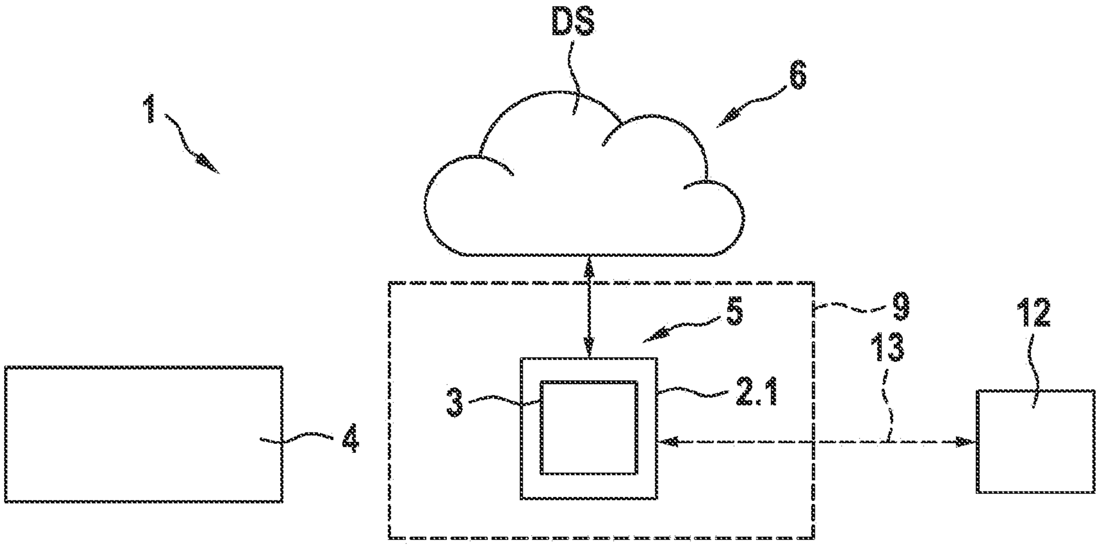
FIG. 2 shows a schematic diagram of a manufacturing environment according to an exemplary embodiment.

FIG. 2 shows a schematic diagram of a manufacturing environment 1 according to a further exemplary embodiment.

It can be seen on the basis of the exemplary embodiment shown in FIG. 2 that a corresponding gateway device 3 can be designed as a network device, i.e. in particular as a router, or can form part of such a network device, wherein the gateway device 3 is integrated structurally into an additive manufacturing device 2.1.

In particular, routers which are designed for the forming of wireless data connections via a standard for mobile communication, in particular LTE, 4G or 5G, can be considered as gateway devices 3. Corresponding routers can be assigned information for identifying the router or the additive manufacturing device 2.1 equipped therewith, for example via a network card, SIM card or the like. It is evident that a corresponding router can comprise, for example, a firewall device 10 implemented on hardware and/or software and/or a data storage device 7 implemented on hardware and/or software. In principle, a corresponding control device 8 is also conceivable.

As mentioned, a corresponding router can be integrated structurally into the additive manufacturing device 2.1, consequently arranged or formed on or in the additive manufacturing device 2.1. A corresponding structural integration can be realised for example in such a way that a receiving region (not shown) or space, for example a chamber-like or -shaped receiving region or space, in which the corresponding router is arranged or formed, is arranged or formed on or in a housing portion (not shown) of the particular additive manufacturing device 2.1, for example on or in a base plate. A corresponding receiving region or space can be closed at least in some sections, optionally fully, in order to protect the router against external influences. A corresponding receiving region or space can be embodied with fastening interfaces, i.e. in particular mechanical fastening interfaces, which allow a (mechanically) stable fastening of the router.

A correspondingly configures additive manufacturing device 2.1, besides the particular function components for carrying out an additive manufacturing operation, which may vary depending on the specific configuration of the additive manufacturing operation 2.1 or the additive manufacturing process implementable therewith, can therefore also comprise a gateway device 3 or a router, via which a separate data connection to or with an external data storage device 6 can be formed or established. This can be implemented in particular in an automatable or automated manner, so that the particular additive manufacturing device 2.1 establishes or maintains a separate data connection to or with an external data storage device 6 independently via the integrated gateway device 3 or the router. A corresponding data connection can be embodied as a VPN tunnel or in the manner thereof.

In this regard, gateway devices 3 or routers which are designed for forming wireless data connections via a standard for mobile communication, in particular LTE, 4G or 5G, can be considered expediently. In this way, the data connection between the particular additive manufacturing device 2.1 and the external data storage device 6 can be formed or established or maintained via a separate independent data connection which is fully independent of a local network environment 4. This represents a significant increase in security, for example against data theft, and, because the data connection, as mentioned, can be established and maintained in an automatable or automated manner independently via the additive manufacturing device 2.1, simplifies the set-up of the additive manufacturing device 2.1 because an integration thereof into an existing (local) network environment 4 is neither necessary nor desirable.

Correspondingly configured additive manufacturing devices 2.1 can therefore have just one connection for power supply; a connection for a, for example socket-like or -shaped, network cable or the like is not necessary.

The invention claimed is:

1. A method for operating an additive manufacturing device of a manufacturing environment comprising at least one additive manufacturing device, wherein data concerning an operation of the at least one additive manufacturing device are transferred from an external data storage device to the at least one additive manufacturing device by a separate data connection, wherein the external data storage device comprises a server, wherein the separate data connection between the external data storage device and the at least one additive manufacturing device is established via a mobile communication standard independent of a local network environment, and wherein the at least one additive manufacturing device comprises a router configured to establish the separate data connection with the external data storage device via the mobile communication standard, wherein the at least one additive manufacturing device is configured to automatically establish the separate data connection to the external data storage device directly via the router upon power supply to the at least one additive manufacturing device.

2. The method of claim 1, wherein the separate data connection is not connectable or connected to the local network environment.

3. The method of claim 2, wherein the router comprises at least one gateway device.

4. The method of claim 3, wherein the at least one gateway device is configured to form an additional network environment separated from the local network environment.

5. The method of claim 4, wherein the at least one gateway device configured to form a data connection to the external data storage device via the additional network environment.

6. The method of claim 5, wherein a firewall device is used; is connected to or formed between the at least one gateway device and the external data storage device.

7. The method of claim 6, wherein a virtual private network is formed between the at least one additive manufacturing device and the external data storage device.

8. The method of claim 7, wherein the at least one gateway device is configured to form a virtual private network between the at least one additive manufacturing device and the external data storage device.

9. The method of claim 8, wherein a data connection to an external communication partner for the purpose of controlling or monitoring an operation of the at least one additive manufacturing device is formed via the at least one gateway device.

10. The method of claim 8, wherein a wireless data connection is formed between the at least one additive manufacturing device and the external data storage device.

11. The method of claim 10, wherein a wireless data connection is formed between the at least one additive manufacturing device and the at least one gateway device and wherein a wired or a wireless data connection is formed between the at least one gateway device and the external data storage device.

12. The method of claim 11, wherein a wireless data connection is formed between the at least one additive manufacturing device and the at least one gateway device or wherein a wireless data connection is formed between the at least one gateway device and the external data storage device.

13. The method of claim 12, wherein a network storage device is used as the external data storage device.

14. The method of claim 13, wherein the separate data connection is encryptable or encrypted.

15. The method of claim 14, wherein a certified data record-containing component-specific parameters or system-specific parameters or process-specific parameters certified by a provider for an additive manufacturing process of at least one specific component of defined component properties is provided via the external data storage device.

16. The method of claim 15, wherein the router is structurally integrated into the at least one additive manufacturing device.

17. The method of claim 1, wherein the at least one additive manufacturing device is configured to establish the separate data connection to the external data storage device during initial set-up.

18. A manufacturing environment, comprising at least one additive manufacturing device, comprising a router configured to form a separate data connection to an external data storage device via a mobile communication standard independent of a local network environment, via which data concerning an operation of the at least one additive manufacturing device are transferred from the external data storage device to at least one additive manufacturing device of the manufacturing environment, wherein the at least one additive manufacturing device is configured to automatically establish the separate data connection to the external data storage device directly via the router upon power supply to the at least one additive manufacturing device, wherein the external storage device comprises a server.

19. The manufacturing environment of claim 18, wherein the router is structurally integrated into the at least one additive manufacturing device.

20. The manufacturing environment of claim 18, wherein the at least one additive manufacturing device is configured to establish the separate data connection to the external data storage device during initial set-up.

21. A communication system comprising:

a manufacturing environment comprising at least one additive manufacturing device;

an external data storage device in which data concerning the operation of the at least one additive manufacturing device are stored; and a gateway device comprising a router configured to form a separate data connection, via which data concerning an operation of the at least one additive manufacturing device are transferred from the external data storage device to the at least one additive manufacturing device of the manufacturing environment, wherein the separate data connection between the external data storage device and the at least one additive manufacturing device is established via a mobile communication standard independent of a local network environment, wherein the router is structurally integrated into the at least one additive manufacturing device, wherein the router is configured to establish the separate data connection with the external data storage device via the mobile communication standard, wherein the at least one additive manufacturing device is configured to automatically establish the separate data connection to the external data storage device directly via the router upon power supply to the at least one additive manufacturing device, and wherein the external storage device comprises a server.

* * * * *